(12) United States Patent
Miller

(10) Patent No.: US 7,015,876 B1
(45) Date of Patent: Mar. 21, 2006

(54) HEADS-UP DISPLAY WITH IMPROVED CONTRAST

(75) Inventor: Robin Mihekun Miller, Ellington, CT (US)

(73) Assignee: Lear Corporation, Southfield, MI (US)

( * ) Notice: Subject to any disclaimer, the term of this patent is extended or adjusted under 35 U.S.C. 154(b) by 729 days.

(21) Appl. No.: 09/090,071

(22) Filed: Jun. 3, 1998

(51) Int. Cl.
   *G09G 5/00* (2006.01)
(52) U.S. Cl. .......................................... 345/7
(58) Field of Classification Search ............... 345/7, 345/8, 9, 207; 359/630; 348/353, 365
   See application file for complete search history.

(56) References Cited

U.S. PATENT DOCUMENTS

| | | | | |
|---|---|---|---|---|
| 5,005,009 A | * | 4/1991 | Roberts | 340/705 |
| 5,128,659 A | * | 7/1992 | Roberts et al. | 340/980 |
| 5,343,206 A | * | 8/1994 | Ansaldi et al. | 342/179 |
| 5,576,724 A | * | 11/1996 | Fukatsu et al. | 345/7 |
| 5,661,454 A | * | 8/1997 | Bezard et al. | 340/461 |
| 5,708,410 A | * | 1/1998 | Blank et al. | 340/438 |
| 5,731,902 A | * | 3/1998 | William et al. | 359/630 |
| 5,784,036 A | * | 7/1998 | Higuchi et al. | 345/7 |
| 5,867,287 A | * | 2/1999 | William et al. | 359/40 |
| 5,949,331 A | * | 9/1999 | Schofield et al. | 340/435 |
| 5,969,969 A | * | 10/1999 | Ejiri et al. | 701/41 |
| 6,081,254 A | * | 6/2000 | Tanaka et al. | 345/154 |

FOREIGN PATENT DOCUMENTS

| | | | |
|---|---|---|---|
| JP | 2-227340 | * | 9/1990 |
| JP | 402227340 | * | 10/1990 |

* cited by examiner

*Primary Examiner*—Patrick N. Edouard
*Assistant Examiner*—Kevin M. Nguyen
(74) *Attorney, Agent, or Firm*—Brooks Kushman P.C.

(57) ABSTRACT

A heads-up display for a vehicle is in contrast to the windshield behind the display or the environment outside the vehicle windshield. In this way, the heads-up display is more visible than prior art heads-up displays. In one embodiment, the windshield is tinted to be in contrast with the color of the heads-up display, at least over a small area. In other embodiments, the image forward of the vehicle is captured and sent to a control for the heads-up display. The heads-up display is then modified to be in contrast with the environment approaching the vehicle. In another embodiment, the window is modified to have a back glow over a small area. The heads-up display is directed onto this small area.

2 Claims, 2 Drawing Sheets

HEADS-UP DISPLAY WITH IMPROVED CONTRAST

This invention relates to several methods for improving the contrast between a heads-up display on a vehicle windshield and a background.

Heads-up displays (HUD) are utilized in many vehicle display functions. Essentially, a heads-up display is directed onto the windshield of the vehicle. The heads-up display provides information to the operator, such as the speed of the vehicle, or other information with regard to the operation of the vehicle.

In the prior art, heads-up displays have typically included display lights which direct the light onto the interior surface of the windshield.

However, in high glare situations, the heads-up display may be sometimes less visible than would be desirable. In addition, the background of the heads-up display is typically the oncoming surroundings of the vehicle. In some situations, there may be an arrangement of environmental factors that have made some heads-up display difficult to see.

It is an object of this invention to improve the contrast and visibility of heads-up displays in a vehicle.

SUMMARY OF THE INVENTION

In a disclosed embodiment of this invention, heads-up displays are provided with arrangements to give the display better contrast and improved visibility. In one basic arrangement, the window is provided with a tinting at least in the area of where the display is directed. The display is chosen to be in a color which contrasts relative to the tint. In this way, the effects of the environment will be less likely to dilute the visibility of the heads-up display.

In other options, a system for providing an indication to a control of the surrounding environment is provided. In one example, a camera captures images in front of the vehicle to identify oncoming surroundings. This image is studied for color, and/or for structural features. Depending on what is oncoming, the control will select an appropriate heads-up display color and/or pattern.

As an example, if the vehicle is heading into a bright blue sky, and there is little in front of the vehicle other than the horizon and blue skies, the control may select a color for the heads-up display other than blue, such as red. If a large red truck is in front of the same vehicle, the control may select blue for the display.

If the environment approaching the vehicle has many small features, such as a gravel road, it may desirable for the heads-up display to be displayed in elongated bars, rather than in dots. Alternatively, if the oncoming environment has many elongated features, such as fields of crops, forming the display in small dots may be preferable.

Although examples are listed, the options depending upon the environment are endless. Applicant will not attempt to exhaust all of the contrasting options for this aspect of the invention. However, many different options are obvious and available.

In a third basic arrangement for providing contrast, some surface treatment is performed on the glass behind the area where the display is directed. As an example, the glass can be roughened. This can occur at the inner surface or at a surface between two panes. Light is directed off the roughened area, and forms a backlighting or "glow" around a small area. It is on the small area where the heads-up display is directed. The surrounding glow makes the heads-up display easily visible. The light is not visible except at this small area. A small amount of light can be directed within the plane of the window at the area, such as from a source in the pillar.

These and other features of the present invention can be best understood from the following specification and drawings, the following of which is a brief description.

DETAILED DESCRIPTION OF THE PREFERRED EMBODIMENT

Figure 1:
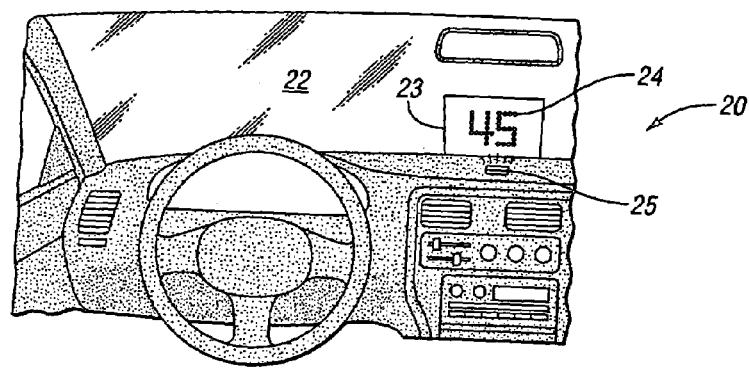
FIG. 1 shows an embodiment of the present invention.

Vehicle 20 is illustrated in FIG. 1 having a windshield 22 provided with a tint portion 23 at least in the area where heads-up display 24 is directed by a source 25 shown schematically. Preferably, the tint covers the whole window. In this invention, the heads-up display is selected to have a color which contrasts to the color of the tint 23. More preferably, the HUD has a color that includes effectively none of the primary color components of the tint. As an example, the tint may be mainly a green tint, while the heads-up display is mainly red. In this way, the heads-up display is in stark contrast to its background and quite visible. This embodiment provides a very simple method of increasing the contrast and visibility of a heads-up display and removing any diluting effect from light passing into the vehicle.

The environment outside the window, or in front of the window, is the background for the heads-up display. This environment can be various colors, or textures, and also can have a good deal of glare. This may make the heads-up display somewhat difficult to see. It is for this reason that the tinted area 23 can provide benefits in increasing the contrast. The tinted area 23 need only be over a small area on the bottom of the windshield where the heads-up display is directed, though full window treatments would be more uniform for the user.

The tint and the heads-up display are preferably selected such they do not have the same primary colors in them. Obviously, a color having a small quantity of a primary color found in one of the tint or display may be included in greater quantities in the other without avoiding the broader aspects of this invention. The contrast would still be achieved. Through proper application, a color seen through the tinting can never match the HUD color.

Figure 2A:
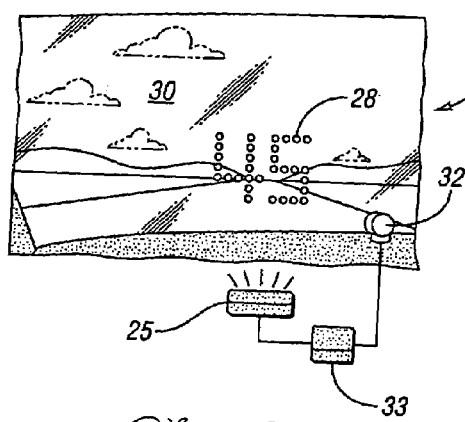
FIG. 2A shows an embodiment in a first situation.

FIG. 2A shows a second embodiment 26 wherein the heads-up display 28 is also selected to be in contrast with the environment 30 approaching the vehicle. In this embodiment a camera 32 "snaps" an image of the upcoming environment. Cameras which are able to provide a digital image which can be processed are becoming widely utilized, and relatively inexpensive. Such cameras are being discussed as being incorporated into the vehicle for many other operational purposes, such as increasing the safety of driving, and avoiding obstacles. Camera 32 is incorporated into the display system, and communicates with a control 33 for a heads-up display output 25. Control 33 analyzes the image and develops a signal to output 25 to create a heads-up display which is in contrast to the environment.

In one example, the heads-up display 28 is selected to be a different color than the background of the approaching environment. Of course, the approaching environment will always consist of many different colors. However, as one example, if the vehicle is approaching a relatively flat area with very blue skies as shown in FIG. 2A, the heads-up display may be selected to be a color other than blue, such as red.

Figure 2B:
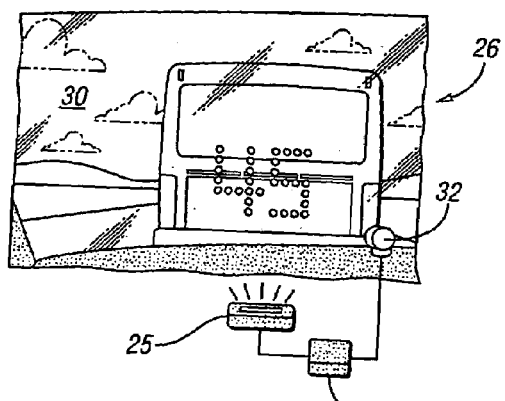
FIG. 2B shows a second situation for the same embodiment.

FIG. 2B shows the same vehicle with a large red truck 37 in front of the vehicle. Control 33 would then change the heads-up display to another color, such as blue.

Figure 3A:
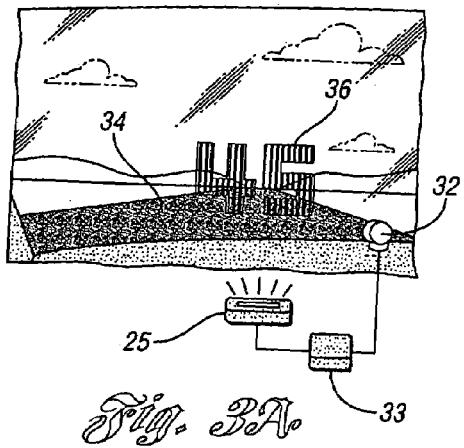
FIG. 3A shows another display option.
Figure 3B:
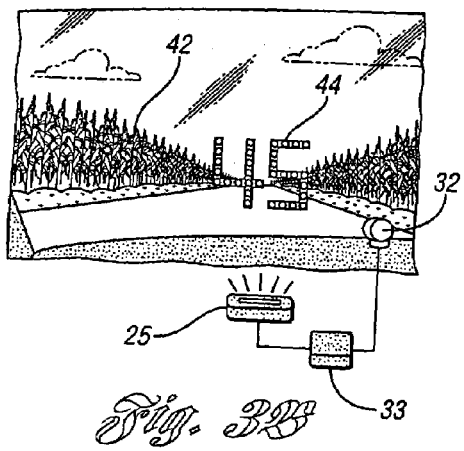
FIG. 3B shows another display option.

FIGS. 3A and 3B show further options in changing the heads-up display as appropriate for the approaching environment. As shown in FIG. 3A, if the camera 32 sees that the approaching environment consists of land with many details, such as a gravel road 34, the heads-up display 36 may be selected to be in elongated bars. This would make the display more visible than if it were in a series of dots.

Alternatively, as shown in FIG. 3B, if the vehicle is driving into an area full of elongated crops 42, it may be desirable to have the heads-up display formed of dots 44.

The control 33 is able to identify certain characteristics of the approaching environment and select from the options of many different display colors and patterns. Of course, the designer will be able to program dozens of different patterns and colors which would all be easily attainable. Applicant will not attempt to list all of those options. Instead, the inventive feature of this invention is considering the environment and tailoring the heads-up display to be appropriate for the approaching environment.

Figure 4:
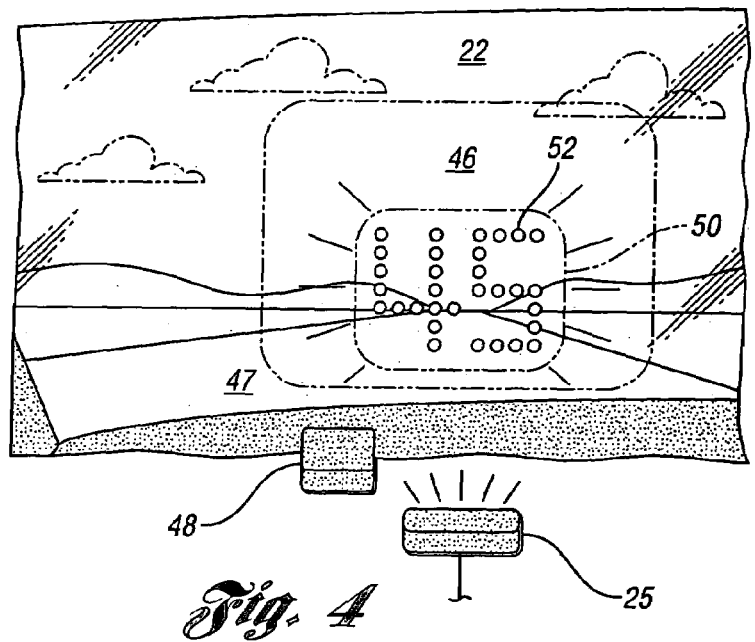
FIG. 4 shows another embodiment of the present invention.

FIG. 4 shows another embodiment wherein a portion of the windshield 46 is provided with surface roughening 47. A light source 48 is positioned adjacent the roughened portion 47. Light is directed off the roughened portion 47, and the light will pass out through the windshield at all areas other than the roughened surface 47. However, at roughened portion 47, a backglow 50 is created. Backglow 50 is then utilized as a base for the heads-up display 52. The heads-up display 52 is thus in contrast and quite visible. The roughened surface may be on the surface of a single-paned window, or at the intersection plane of a dual-pane or dual process window. Alternatively, during manufacture of a single pane, localized effects can be performed at a mid point, such that the final pane has the effect of the surface at a central layer. Other methods including fiber alignment with the window glass, or stress induced localized microcracking may be used.

This embodiment thus provides a good contrast for the heads-up display.

Figure 5A:
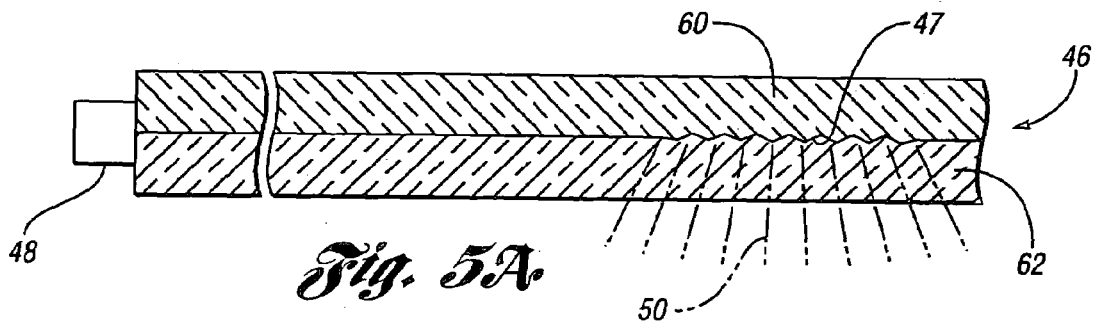
FIG. 5A is a cross-section of a first way of achieving the FIG. 4 arrangement.

FIG. 5A shows windshield 46 formed of two planes 60, 62. Roughened area 47 is between the two planes. Light from source 48 passes within the plane of the windshield 46 and creates the glow as described above.

Figure 5B:
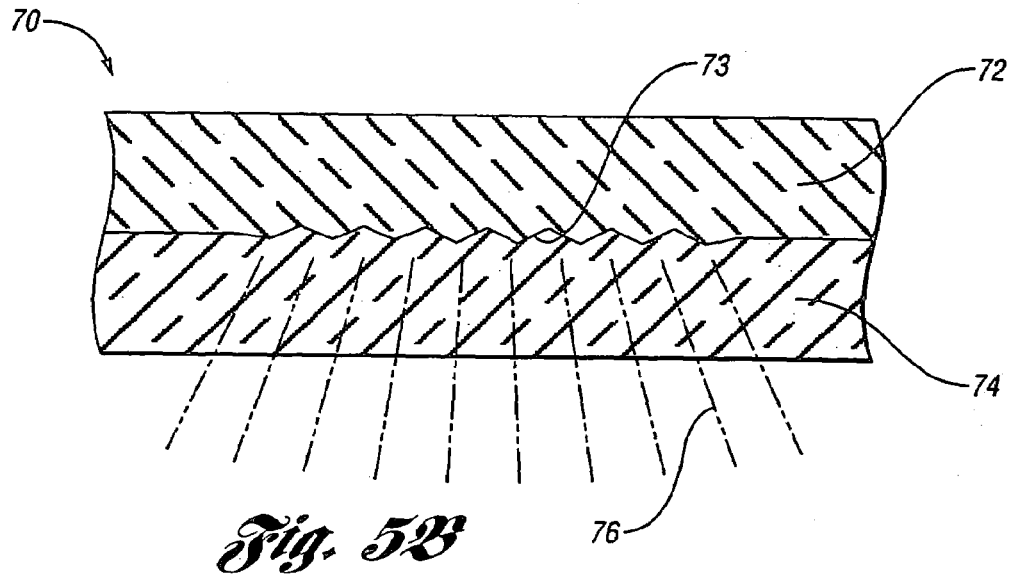
FIG. 5B shows a second way of achieving the FIG. 4 arrangement.

FIG. 5B shows a second embodiment 70 wherein a single panel 72 is provided with roughened area 73. Coating 74 seals over the area 73 backglow 76 is created similar to the above embodiment.

The invention has been disclosed somewhat schematically. The appropriate structure for creating heads-up displays, for modifying the heads-up displays, and for controlling the heads-up displays in consideration of the environment, etc., are all within the skill of a worker in this art. The inventive aspects of this invention relate to providing a contrast, and in some embodiments providing a contrast based upon the approaching environment.

Preferred embodiments of this invention have been disclosed, however, a worker of ordinary skill in the art would recognize that modifications of the present invention come within the scope of this invention. For that reason, the following claims should be studied to determine the true scope and content of this invention.

What is claimed is:

1. A vehicle heads-up display system comprising:
   a source for providing a heads-up display onto a windshield of a moving vehicle; and
   an arrangement for controlling the contrast of the heads-up display relative to an environmental image approaching the moving vehicle, wherein the arrangement includes an optical detector for capturing the environmental image approaching the moving vehicle and a control coupled to the optical detector for determining texture of the environmental image and for controlling the contrast of the heads-up display in response to the texture of the environmental image approaching the moving vehicle; and
   wherein the control arrangement selects an appropriate fill pattern for the heads-up display dependent upon the texture of the environmental image in order to contrast the heads-up display relative to the environmental image.

2. A method of providing a heads-up display comprising the steps of:
   (a) providing a system for directing a heads-up display onto the windshield of a moving vehicle;
   (b) directing a heads-up display onto the vehicle windshield; and
   (c) controlling the contrast of the heads-up display relative to an environmental image approaching the moving vehicle, wherein the steps of controlling includes the step of capturing the environmental image approaching the moving vehicle, the step of determining structural features of the environmental image, and the step of controlling the contrast of the heads-up display in response to the structural features of the environmental image by selecting an appropriate fill pattern for the heads-up display dependent upon the structural features of the environmental image in order to contrast the heads-up display relative to the environmental image.

* * * * *